(12) United States Patent
Weissman

(10) Patent No.: US 6,449,477 B1
(45) Date of Patent: Sep. 10, 2002

(54) RADIO FREQUENCY COVERAGE OF AN ENCLOSED REGION BY ARRANGEMENT OF TRANSCEIVERS WITHIN THE REGION

(75) Inventor: Haim Weissman, Haifa (IL)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/557,723

(22) Filed: Apr. 25, 2000

(51) Int. Cl.7 .............................................. H04B 7/185
(52) U.S. Cl. ..................... 455/422; 455/426; 455/552; 455/63; 455/561; 455/423; 455/446
(58) Field of Search ................................. 455/426, 552, 455/67.1, 63, 111, 15, 560, 561, 423, 424, 446, 13.1, 16, 422

(56) References Cited

U.S. PATENT DOCUMENTS

| | | | |
|---|---|---|---|
| 4,901,307 A | | 2/1990 | Gilhousen et al. ............. 370/18 |
| 5,404,570 A | | 4/1995 | Charas et al. .................. 455/22 |
| 5,513,176 A | | 4/1996 | Dean et al. ..................... 370/18 |
| 5,603,080 A | * | 2/1997 | Kallander et al. ............. 455/14 |
| 5,890,055 A | * | 3/1999 | Chu et al. ...................... 455/16 |
| 5,930,293 A | * | 7/1999 | Light et al. ................. 375/211 |
| 5,946,622 A | | 8/1999 | Bojeryd ........................ 455/444 |
| 6,032,020 A | | 2/2000 | Cook et al. ..................... 455/7 |
| 6,076,823 A | * | 6/2000 | Chavez et al. ............... 370/337 |
| 6,125,109 A | * | 9/2000 | Fuerter ........................ 370/315 |
| 6,157,818 A | * | 12/2000 | Rode ............................ 370/313 |
| 6,178,334 B1 | * | 1/2001 | Shyy et al. .................. 455/446 |
| 6,272,351 B1 | * | 8/2001 | Langston et al. ............. 348/21 |
| 6,373,832 B1 | * | 4/2002 | Huang et al. ................ 370/342 |
| 6,374,119 B1 | * | 4/2002 | Jun et al. .................... 455/11.1 |
| 6,405,018 B1 | * | 6/2002 | Reudink et al. ............. 343/844 |
| 2002/0016152 A1 | * | 2/2002 | Weissman et al. ............. 455/16 |
| 2002/0039885 A1 | * | 4/2002 | Weissman et al. ............. 455/20 |

FOREIGN PATENT DOCUMENTS

DE    9844099    9/1998    ............ H04Q/7/24

* cited by examiner

Primary Examiner—William Trost
Assistant Examiner—Marcos Torres
(74) Attorney, Agent, or Firm—Philip Wadsworth; Charles D. Brown; Bruce W. Greenhaus

(57) ABSTRACT

A method for communicating between a mobile transceiver in a multistory building and a wireless communication network external to the building, the building including alternating even and odd floors and having a near side and a far side, the method including dividing a plurality of slave transceivers into a main sub-group of slave transceivers and a diversity sub-group of slave transceivers, the transceivers being operative to transmit signals of a type which are conveyed over the wireless communication network. The method further includes positioning at the near side of at least one of the even floors one of the slave transceivers from the main sub-group and positioning at the far side of the at least one of the even floors one of the slave transceivers from the diversity sub-group, and also positioning at the near side of at least one of the odd floors another one of the slave transceivers from the diversity sub-group and positioning at the far side of the at least one of the odd floors another one of the slave transceivers from the main sub-group. The method further includes conveying a signal between the wireless communication network and the mobile transceiver via one or more of the plurality of slave transceivers positioned in the building.

27 Claims, 2 Drawing Sheets

RADIO FREQUENCY COVERAGE OF AN ENCLOSED REGION BY ARRANGEMENT OF TRANSCEIVERS WITHIN THE REGION

FIELD OF THE INVENTION

The present invention relates generally to reception of electromagnetic signals, and specifically to reception of electromagnetic signals in enclosed regions.

BACKGROUND OF THE INVENTION

In cellular communications systems there are typically regions where the coverage is difficult or incomplete, for example, within metal-framed structures, and underground. Methods for improving the coverage in regions such as these are known in the art.

U.S. Pat. No. 5,404,570, to Charas et al, whose disclosure is incorporated herein by reference, describes a repeater system used between a base transceiver station (BTS), which is able to receive signals, and a closed environment such as a tunnel, which is closed off to transmissions from the BTS. The system down-converts a high radio-frequency (RF) signal from the BTS to an intermediate frequency (IF) signal, which is then radiated by a cable and an antenna in the closed environment to a receiver therein. The receiver up-converts the IF signal to the original RF signal. Systems described in the disclosure include a vehicle moving in a tunnel, so that passengers in the vehicle who would otherwise be cut off from the BTS are able to receive signals.

U.S. Pat. No. 5,603,080 to Kallandar et al., whose disclosure is incorporated herein by reference, describes a plurality of repeater systems used between a plurality of BTSs and a closed environment, which is closed off to transmissions from the BTSs. Each system down-converts an RF signal from its respective BTS to an IF signal, which is then transferred by a cable in the closed environment to one or more respective receivers therein. Each receiver up-converts the IF signal to the original RF signal. Systems described in the disclosure include a vehicle moving between overlapping regions in a tunnel, each region covered by one of the BTSs via its repeater system. Thus, passengers in the vehicle who would otherwise be cut off from one or more of the BTSs are able to receive signals from at least one of the BTSs throughout the tunnel.

U.S. Pat. No. 5,765,099, to Georges et al., whose disclosure is incorporated herein by reference, describes a system and method for transferring an RF signal between two or more regions using a low bandwidth medium such as twisted pair cabling. In a first region the RF signal is mixed with a first local oscillator to produce a down-converted IF signal. The IF signal is transferred to a second region via the low bandwidth medium, wherein the signal is up-converted to the original RF signal using a second local oscillator. The local oscillators are each locked by a phase locked loop (PLL) in each region to generate the same frequency, the locking being performed in each loop by comparing the local oscillator frequency with a single low frequency stable reference signal generated in one region. The reference signal is transferred between the regions via the low bandwidth medium.

U.S. Pat. No. 5,513,176, to Dean et al., whose disclosure is incorporated herein by reference, describes a distributed antenna array within a region where reception is difficult. The performance of the antenna array is enhanced by generating signal diversity within the array. Each antenna in the array has a differential time delay applied to signals that it receives, thus generating received signal diversity. The differentially-delayed signals are preferably down-converted to an intermediate frequency and are then transferred out of the region via a cable.

U.S. Pat. No. 5,930,293, to Light, et al., whose disclosure is incorporated herein by reference, describes a wireless repeater comprising first and second spatially-separated antennas. Both antennas receive a signal from a transmitter, and the signal received by the second antenna has a time delay added to the original signal. The two signals are summed to form one aggregate signal, which is transmitted from a third antenna. A receiver of the aggregate signal is able to reconstruct the signals received by the first and second antennas.

SUMMARY OF THE INVENTION

It is an object of some aspects of the present invention to provide an arrangement of transceivers of electromagnetic wireless signals that improves the reception of the signals within an enclosed region.

In preferred embodiments of the present invention, a plurality of wireless slave transceivers are positioned within a multistory building, in locations that are generally cut off from external electromagnetic radiation. The plurality of slave transceivers are divided into two sub-groups of slave transceivers, typically a main group and a diversity group, as is known in the art. Both sub-groups of slave transceivers transfer signals to and from a master transceiver via cables. The master transceiver communicates with one or more base transceiver stations (BTSs), typically associated with a cellular communications network. Preferably, at least one of the BTSs is outside the building. Optionally, at least one of the BTSs is inside the building, in which case these BTSs preferably communicate with a base station controller. Alternatively, the at least one BTS within the building, the master transceiver, and the plurality of slave transceivers, form a generally closed communications network. The slave transceivers are positioned within the building so that a mobile transceiver, for example a cellular telephone, within the building is generally able to transfer signals to and from at least one of the plurality of slave transceivers in each of the sub-groups. Thus, the mobile transceiver communicates with the one or more BTSs via the slave transceivers and the master transceiver.

For the purposes of preferred embodiments of the present invention, a near side and a far side of the building are selected for the purpose of positioning the slave transceivers. The choice of "near" and "far" is arbitrary, wherein the object of the choice is that the near and far sides be as distant from one another as is practical, given any other constraints that may be imposed on the locations of the transceivers. On each even floor a slave transceiver from the first sub-group is positioned at the near side of the building, and a slave transceiver from the second sub-group is positioned at the far side of the building. On each odd floor, a slave transceiver from the first sub-group is positioned at the far side of the floor, and a slave transceiver from the second sub-group is positioned at the near side.

The transceivers are thus positioned throughout the multistory building in an alternating pattern. On any specific floor the transceivers of the first and second sub-groups are separated because the respective transceivers are at opposite ends of the building. Thus the transceivers of each sub-group can operate as main and diversity transceivers respectively. Between different floors of the building, the transceivers within each sub-group are separated by two floors because of the alternating pattern described above, so that the smallest vertical separation of transceivers within the sub-group is two stories. This is approximately double the separation afforded by in-building coverage systems known in the art, in which the transceivers are not in an alternating pattern. By increasing the separation of slave transceivers within each sub-group, interference effects caused by slave transceivers within the sub-group transferring the same transmission to or from the mobile transceiver are significantly reduced.

There is therefore provided, in accordance with a preferred embodiment of the present invention, a method for communicating between a mobile transceiver in a multistory building and a wireless communication network, the building including alternating even and odd floors and having a near side and a far side, the method including:

dividing a plurality of slave transceivers into a main sub-group of slave transceivers and a diversity sub-group of slave transceivers, the transceivers being operative to transmit signals of a type which are conveyed over the wireless communication network;

positioning at the near side of at least one of the even floors one of the slave transceivers from the main sub-group and positioning at the far side of the at least one of the even floors one of the slave transceivers from the diversity sub-group;

positioning at the near side of at least one of the odd floors another one of the slave transceivers from the diversity sub-group and positioning at the far side of the at least one of the odd floors another one of the slave transceivers from the main sub-group; and conveying a signal between the wireless communication network and the mobile transceiver via one or more of the plurality of slave transceivers positioned in the building.

Preferably, conveying the signal between the wireless communication network and the mobile transceiver includes:

conveying the signal from the diversity sub-group via a diversity splitter/combiner which splits and combines the signal from the diversity sub-group;

conveying the signal from the main sub-group via a main splitter/combiner which splits and combines the signal from the main sub-group; and positioning the diversity and main splitter/combiners close to a center line of the building.

Preferably, conveying the signal between the wireless communication network and the mobile transceiver includes conveying the signal between a base transceiver station included in the network and the mobile transceiver.

Preferably, positioning at the near side of the at least one of the even floors includes positioning a first one of the transceivers from the main sub-group at a near end of a first corridor included in the at least one of the even floors, positioning at the far side of the at least one of the even floors includes positioning a first one of the transceivers from the diversity sub-group at a far end of the first corridor, positioning at the near side of the at least one of the odd floors includes positioning a second one of the transceivers from the diversity sub-group at the near end of a second corridor included in the at least one of the odd floors, and positioning at the far side of the at least one of the odd floors includes positioning a second one of the transceivers from the main sub-group at the far end of the second corridor.

Preferably, positioning at the near side of the at least one of the even floors includes positioning the slave transceivers from the main sub-group at the near side of substantially all the even floors, positioning at the far side of the at least one of the even floors includes positioning the slave transceivers from the diversity sub-group at the far side of substantially all the even floors, positioning at the near side of the at least one of the odd floors includes positioning the slave transceivers from the diversity sub-group at the near side of substantially all the odd floors, and positioning at the far side of the at least one of the odd floors includes positioning the slave transceivers from the main sub-group at the near side of substantially all the even floors.

Preferably, the wireless communication network comprises a cellular communication network.

Preferably, the diversity sub-group of slave transceivers are operative to receive signals that are distinguishable from the signals received by the main sub-group of slave transceivers.

Preferably, the building is substantially closed off to electromagnetic radiation transmitted over-the-air from a source external to the building.

Further preferably, conveying the signal between the wireless communication network and the mobile transceiver includes down-converting the signal to an intermediate frequency (IF) signal and recovering the signal by up-converting the IF signal.

Preferably, the wireless communication network is external to the building

Alternatively, the wireless communication network is within the building.

There is further provided, in accordance with a preferred embodiment of the present invention, apparatus for communicating between a mobile transceiver in a multistory building and a wireless communication network, the building including alternating even and odd floors and having a near side and a far side, the apparatus including:

a plurality of slave transceivers, operative to transmit signals between the wireless communication network and the mobile transceiver, the slave transceivers including:

a group of main slave transceivers, one of the group being positioned on at least one of the even floors at the near side of the building, another one of the group being positioned on at least one of the odd floors at the far side of the building; and a group of diversity slave transceivers, one of the group being positioned on the at least one of the even floors at the far side of the building, another one of the group being positioned on the at least one of the odd floors at the near side of the building.

Preferably, the apparatus includes:

a diversity splitter/combiner which splits or combines the signal from the diversity group and which is positioned close to a center line of the building; and a main splitter/combiner which splits or combines the signal from the main group and which is positioned close to the center line of the building.

Further preferably, the apparatus includes a master transceiver coupled to exchange the signal with the main and diversity groups of slave transceivers, and to communicate with a base transceiver station of the wireless network, so that the signal is conveyed between the base transceiver station and the mobile transceiver via the master transceiver.

Preferably, the at least one of the even floors includes an even corridor and the at least one of the odd floors includes an odd corridor,
wherein one of the group of main slave transceivers is positioned at a far end of the even corridor and another one of the group of main slave transceivers is positioned at a near end of the odd corridor, and
wherein one of the group of diversity slave transceivers is positioned at a near end of the even corridor and another one of the group of diversity slave transceivers is positioned at a far end of the odd corridor.

Preferably, one of the group of main slave transceivers is positioned on the near side of each of the even floors and another one of the group of main slave transceivers is positioned on the far side of each of the odd floors, and
one of the group of diversity slave transceivers is positioned on the far side of each of the even floors and another one of the group of diversity slave transceivers is positioned on the near side of each of the odd floors.

Preferably, the wireless communication network includes a cellular communication network.

Preferably, the group of diversity slave transceivers are operative to receive signals that are distinguishable from the signals received by the group of main slave transceivers.

Further preferably, the building is substantially closed off to electromagnetic radiation transmitted over-the-air from a source external to the building.

Preferably, the wireless communication network is external to the building.

Alternatively, the wireless communication network is within the building.

There is further provided, in accordance with a preferred embodiment of the present invention, a method for communicating between a mobile transceiver in a building having one or more floors and a wireless communication network, the method including:
dividing a plurality of slave transceivers into a main sub-group of slave transceivers and a diversity sub-group of slave transceivers, the transceivers being operative to transmit signals of a type which are conveyed over the wireless communication network;
positioning on at least one of the floors of the building at least one slave transceiver of a first one of the sub-groups and a plurality of slave transceivers of a second one of the sub-groups, so that a nearest neighbor of each slave transceiver on the at least one of the floors belongs to the other sub-group; and
conveying a signal between the wireless communication network and the mobile transceiver via one or more of the plurality of slave transceivers positioned in the building.

Preferably, positioning on the at least one of the floors includes measuring the nearest neighbor of each slave transceiver on the at least one of the floors in a generally horizontal direction.

Alternatively, positioning on the at least one of the floors includes measuring the nearest neighbor of each slave transceiver on the at least one of the floors in a generally non-horizontal direction.

There is further provided, in accordance with a preferred embodiment of the present invention, apparatus for communicating between a mobile transceiver in a building having one or more floors and a wireless communication network, including:
a plurality of slave transceivers, operative to transmit signals between the wireless communication network and the mobile transceiver, the slave transceivers including:
a main sub-group of slave transceivers; and
a diversity sub-group of slave transceivers, at least one of a first one of the sub-groups and a plurality of a second one of the sub-groups being positioned on at least one floor, so that a nearest neighbor of each slave transceiver on the at least one of the floors belongs to the other sub-group.

Preferably, the nearest neighbor of each slave transceiver is measured in a generally horizontal direction.

Alternatively, the nearest neighbor of each slave transceiver is measured in a generally non-horizontal direction.

The present invention will be more fully understood from the following detailed description of the preferred embodiments thereof, taken together with the drawings, in which:

DETAILED DESCRIPTION OF PREFERRED EMBODIMENTS

Figure 1:
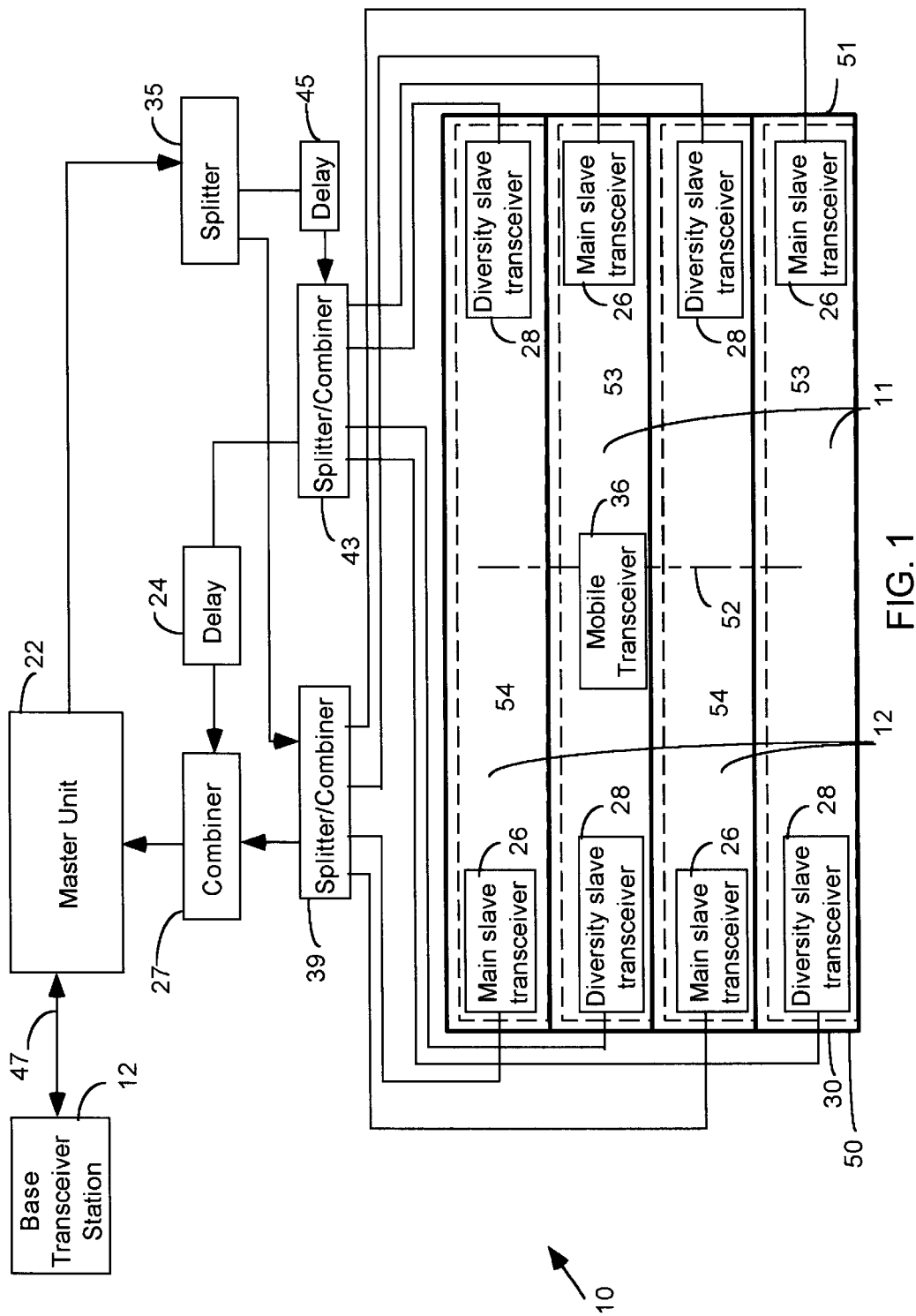
FIG. 1 is a schematic diagram showing an in-building transceiver arrangement, according to a preferred embodiment of the present invention.

Reference is now made to FIG. 1, which is a schematic diagram showing an in-building transceiver arrangement 10, according to a preferred embodiment of the present invention. A multistory building 30 is substantially closed off to electromagnetic radiation transmitted over-the-air from a source external to the building. Building 30 comprises a plurality of even floors 12 and a plurality of odd floors 11. Building 30 lies in a general north-south direction, and has a north side 50 and a south side 51, also respectively termed herein near side 50 and far side 51. The north-south direction of building 30 is assumed for the purposes of example, and it will be appreciated that the direction of building 30 is immaterial to the present invention.

A mobile transceiver 36 within building 30, such as an industry-standard mobile telephone, emits a radio frequency (RF) signal of a type which is receivable by a base transceiver station (BTS) 12, which is operative as part of a wireless communication network. Preferably, BTS 12 is external to building 30. Alternatively, BTS 12 is within building 30. Preferably, the RF signal emitted by mobile transceiver 36, herein also termed the mobile RF transmitted signal, is a code division multiple access (CDMA) signal operating at an industry-standard chip rate, although the principles of the present invention are also applicable to other coding and transmission schemes.

A first sub-group of slave transceivers 26, herein also termed main slave transceivers, are positioned within floors 11 and 12. On each even floor 12 one of the sub-group of main slave transceivers 26 is positioned at north side 50 of building 30. On each odd floor 11 one of the sub-group of main slave transceivers 26 is positioned at south side 51 of building 30. Main slave transceivers 26 are most preferably connected in a star configuration, by one or more active or passive splitter/combiners 39. Alternatively, slave transceivers 26 are connected in a daisy chain or a hybrid star-daisy chain configuration. Further alternatively, transceivers 26 are connected in a hybrid active-passive configuration.

A second sub-group of slave transceivers 28, herein also termed diversity slave transceivers, are positioned within floors 11 and 12. On each even floor 12 one of the sub-group of diversity slave transceivers 28 is positioned at south side 51 of building 30. On each odd floor 11 one of the sub-group of diversity slave transceivers 28 is positioned at north side 50 of building 30. Diversity slave transceivers 28 are most preferably connected in a star configuration, by one or more active or passive splitter/combiners 43. Alternatively, slave transceivers 28 are connected in a daisy chain or a hybrid star-daisy chain configuration. Further alternatively, transceivers 28 are connected in a hybrid active-passive configuration.

Arrangement 10, as described hereinabove, is one example of an alternating arrangement for positioning a first and a second sub-group of transceivers within a multistory building comprising interleaved odd and even floors. In alternating arrangements such as these, there is a main and a diversity transceiver positioned at opposite sides of each odd floor, and there is a diversity and a main transceiver positioned at opposite sides of each even floor. The positioning is such that a main transceiver on each even floor is generally vertically above a diversity transceiver on each odd floor, and a diversity transceiver on each even floor is generally vertically above a main transceiver on each odd floor.

In alternating arrangement 10 described hereinabove, on each floor main slave transceiver 26 is separated spatially from diversity slave transceiver 28, but otherwise the slave transceivers are all substantially similar in construction and operation. A detailed description of the operation and construction of suitable slave transceivers is given in a U.S. Patent Application entitled "In-Building Radio Frequency Coverage," filed Oct. 29, 1999, which is assigned to the assignee of the present application and whose disclosure is incorporated herein by reference. The spatial separation is sufficient so that when transceiver 36 makes a transmission, on each floor the RF signal received by main slave transceiver 26 is distinguishable from the RF signal received by the diversity slave transceiver 28; for example, the received signals may differ in amplitude, or in phase, or in time of arrival, or in a combination of these or other signal parameters. Each main slave transceiver 26 receives the RF signal from mobile transceiver 36 as a main RF signal, and each diversity slave transceiver 28 receives the RF signal from transceiver 36 as a diversity RF signal.

Main slave transceivers 26 down-convert their respective RF signals to a main IF signal and transfer the main IF signal via splitter/combiner 39 to a combiner 27. Similarly, diversity slave transceivers 28 down-convert their respective RF signals to a diversity IF signal and transfer the diversity IF signal via splitter/combiner 43 and a delay 24 to combiner 27. Combiner 27 combines the main and diversity IF signals and transfers the combined IF signal to a master transceiver 22 which up-converts the combined IF signal to a recovered RF signal. The recovered RF signal, and/or information within the signal, is then transferred by one or more cables 47 or over-the-air to BTS 12. Similarly, RF signals from BTS 12 are transferred to master transceiver 22, wherein they are down-converted to an IF signal and transferred via a splitter 35, a delay 45, splitter/combiner 43 and splitter/combiner 39 to slave transceivers 26 and 28. Slave transceivers 26 and 28 up-convert their respective IF signals to RF signals, and transmit the RF signals within building 30. A detailed description of the operation of suitable master and main and diversity slave transceivers is given in a U. S. Patent application entitled "Radio Frequency Coverage of Enclosed Regions" filed concurrently with this application, which is assigned to the assignee of the present application and whose disclosure is incorporated herein by reference.

In some preferred embodiments of the present invention when BTS 12 is within building 30, BTS 12, master transceiver 36, slave transceivers 26, and slave transceivers 28, operate as a generally closed wireless communication network within the building.

As is known in the art, interference effects which degrade signal reception occur if slave transceivers of a particular sub-group, for example main slave transceivers 26, are too close together, since the signals may combine destructively. The destructive interference effects can occur for signals transmitted from mobile transceiver 36 to slave transceivers 26 and vice versa. Alternating positioning arrangements such as arrangement 10 reduce the effects of destructive interference in two ways compared to non-alternating arrangements. The vertical separation between transceivers of the same type is effectively doubled. In addition to doubling the vertical separation, transceivers of the same type are separated by two floors, so that a signal transmitted directly to a transceiver on one floor has to pass through two floors to reach a similarly placed transceiver of the same type. Passage through the physical structure of the two floors substantially reduces the amplitude of the signal compared to passage through one floor in non-alternating arrangements, so reducing destructive interference effects.

In some preferred embodiments of the present invention, splitter/combiner 39 and splitter/combiner 43 are placed close to a center line 52 of building 30. By placing the splitter/combiners close to the center line and correspondingly near to each other, cables from both splitter/combiners to the transceivers at a specific side of building 30 can share the same cable guides.

In some preferred embodiments of the present invention, each even floor 12 of building 30 comprises a corridor 54 and each odd floor 11 comprises a corridor 53. The plurality of corridors run between near side 50 and far side 51 of building 30 and are generally parallel to and vertically above each other. Transceivers are positioned in the alternating pattern described above by placing one main slave transceiver 26 at near side 50 of each even-floor corridor 54, and one diversity slave transceiver 28 at far side 51 of each even-floor corridor 54. For each odd-floor corridor 53 the positioning of the main and diversity transceivers is reversed.

Figure 2:
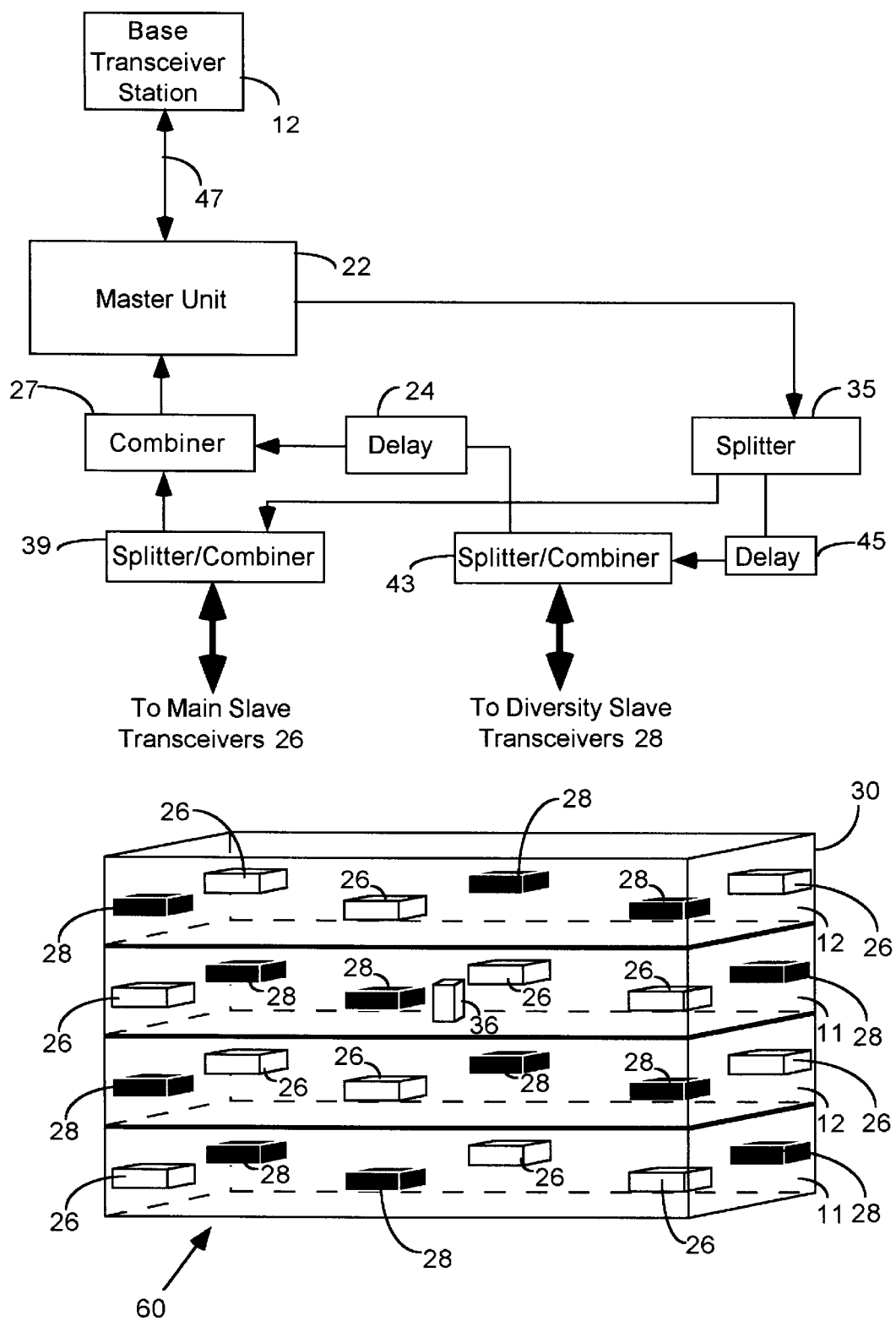
FIG. 2 is a schematic diagram showing an alternative in-building transceiver arrangement, according to a preferred embodiment of the present invention.

FIG. 2 is a schematic diagram showing an alternative in-building transceiver arrangement 60, according to a preferred embodiment of the present invention. Apart from the differences described below, the operation of arrangement 60 is generally similar to that of arrangement 10 (FIG. 1), so that elements indicated by the same reference numerals in both arrangements 60 and 10 are generally identical in construction and in operation. On each floor of building 30 a plurality of main slave transceivers 26 and a plurality of diversity slave transceivers 28 are positioned so that signals from mobile transceiver 36 at substantially all positions on each floor are receivable by at least one of transceivers 26 and 28. The slave transceivers are positioned so that a nearest neighbor of each main slave transceiver 26 is one of the plurality of diversity slave transceivers 28, and so that a nearest neighbor of each diversity slave transceiver 28 is one of the plurality of main slave transceivers 26, thus generating an alternating arrangement of transceivers. The statement hereinabove concerning nearest neighbors is to be understood as applying to nearest neighbors measured in a generally horizontally direction, e.g., within a floor of building 30. The statement is also to be understood as applying to nearest neighbors measured in a generally non-horizontal direction, e.g., between floors of building 30. Measurements are to be understood as being made physically within the building, or by a non-physical method such as a simulation or a computation.

Preferably transceivers 26 and 28 are positioned within each floor of building 60 on a generally rectangular grid. Alternatively, transceivers 26 and 28 are positioned within each floor of building 60 on a non-rectangular grid. Further preferably, transceivers 26 and 28 are positioned between floors of building 60 on one or more generally rectangular grids. Alternatively, transceivers 26 and 28 are positioned between floors of building 60 on one or more non-rectangular grids.

In some preferred embodiments of the present invention, building 30 is a single-story building, such as a large convention hall, having an alternating arrangement similar to arrangement 60 operative within the building.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

I claim:

1. A method for communicating between a mobile transceiver in a multistory building and a wireless communication network, the building including alternating even and odd floors and having a near side and a far side, the method comprising:

dividing a plurality of slave transceivers into a main sub-group of slave transceivers and a diversity sub-group of slave transceivers, the transceivers being operative to transmit signals of a type which are conveyed over the wireless communication network;

positioning at the near side of at least one of the even floors one of the slave transceivers from the main sub-group and positioning at the far side of the at least one of the even floors one of the slave transceivers from the diversity subgroup;

positioning at the near side of at least one of the odd floors another one of the slave transceivers from the diversity sub-group and positioning at the far side of the at least one of the odd floors another one of the slave transceivers from the main sub-group; and conveying a signal between the wireless communication network and the mobile transceiver via one or more of the plurality of slave transceivers positioned in the building.

2. The method according to claim 1, wherein conveying the signal between the wireless communication network and the mobile transceiver comprises:

conveying the signal from the diversity sub-group via a diversity splitter/combiner which splits and combines the signal from the diversity sub-group;

conveying the signal from the main sub-group via a main splitter/combiner which splits and combines the signal from the main sub-group; and positioning the diversity and main splitter/combiners close to a center line of the building.

3. The method according to claim 1, wherein conveying the signal between the wireless communication network and the mobile transceiver comprises conveying the signal between a base transceiver station comprised in the network and the mobile transceiver.

4. The method according to claim 1, wherein positioning at the near side of the at least one of the even floors comprises positioning a first one of the transceivers from the main sub-group at a near end of a first corridor comprised in the at least one of the even floors, wherein positioning at the far side of the at least one of the even floors comprises positioning a first one of the transceivers from the diversity sub-group at a far end of the first corridor, wherein positioning at the near side of the at least one of the odd floors comprises positioning a second one of the transceivers from the diversity sub-group at the near end of a second corridor comprised in the at least one of the odd floors, and wherein positioning at the far side of the at least one of the odd floors comprises positioning a second one of the transceivers from the main sub-group at the far end of the second corridor.

5. The method according to claim 1, wherein positioning at the near side of the at least one of the even floors comprises positioning the slave transceivers from the main sub-group at the near side of substantially all the even floors, wherein positioning at the far side of the at least one of the even floors comprises positioning the slave transceivers from the diversity sub-group at the far side of substantially all the even floors, wherein positioning at the near side of the at least one of the odd floors comprises positioning the slave transceivers from the diversity sub-group at the near side of substantially all the odd floors, and wherein positioning at the far side of the at least one of the odd floors comprises positioning the slave transceivers from the main sub-group at the near side of substantially all the even floors.

6. The method according to claim 1, wherein the wireless communication network comprises a cellular communication network.

7. The method according to claim 1, wherein the diversity sub-group of slave transceivers are operative to receive signals that are distinguishable from the signals received by the main sub-group of slave transceivers.

8. The method according to claim 1, wherein the building is substantially closed off to electromagnetic radiation transmitted over-the-air from a source external to the building.

9. The method according to claim 1, wherein conveying the signal between the wireless communication network and the mobile transceiver comprises down-converting the signal to an intermediate frequency (IF) signal and recovering the signal by up-converting the IF signal.

10. The method according to claim 1, wherein the wireless communication network is external to the building.

11. The method according to claim 1, wherein the wireless communication network is within the building.

12. Apparatus for communicating between a mobile transceiver in a multistory building and a wireless communication network, the building including alternating even and odd floors and having a near side and a far side, the apparatus comprising:

a plurality of slave transceivers, operative to transmit signals between the wireless communication network and the mobile transceiver, the slave transceivers comprising:

a group of main slave transceivers, one of the group being positioned on at least one of the even floors at the near side of the building, another one of the group being positioned on at least one of the odd floors at the far side of the building; and a group of diversity slave transceivers, one of the group being positioned on the at least one of the even floors at the far side of the building, another one of the group being positioned on the at least one of the odd floors at the near side of the building.

13. The apparatus according to claim 12, and comprising:

a diversity splitter/combiner which splits or combines the signal from the diversity group and which is positioned close to a center line of the building; and a main splitter/combiner which splits or combines the signal from the main group and which is positioned close to the center line of the building.

14. The apparatus according to claim 13, and comprising a master transceiver coupled to exchange the signal with the main and diversity groups of slave transceivers, and to communicate with a base transceiver station of the wireless network, so that the signal is conveyed between the base transceiver station and the mobile transceiver via the master transceiver.

15. The apparatus according to claim 12, wherein the at least one of the even floors comprises an even corridor and the at least one of the odd floors comprises an odd corridor, wherein one of the group of main slave transceivers is positioned at a far end of the even corridor and another one of the group of main slave transceivers is positioned at a near end of the odd corridor, and wherein one of the group of diversity slave transceivers is positioned at a near end of the even corridor and another one of the group of diversity slave transceivers is positioned at a far end of the odd corridor.

16. The apparatus according to claim 12, wherein one of the group of main slave transceivers is positioned on the near side of each of the even floors and another one of the group of main slave transceivers is positioned on the far side of each of the odd floors, and wherein one of the group of diversity slave transceivers is positioned on the far side of each of the even floors and another one of the group of diversity slave transceivers is positioned on the near side of each of the odd floors.

17. The apparatus according to claim 12, wherein the wireless communication network comprises a cellular communication network.

18. The apparatus according to claim 12, wherein the group of diversity slave transceivers are operative to receive signals that are distinguishable from the signals received by the group of main slave transceivers.

19. The apparatus according to claim 12, wherein the building is substantially closed off to electromagnetic radiation transmitted over-the-air from a source external to the building.

20. The apparatus according to claim 12, wherein the wireless communication network is external to the building.

21. The apparatus according to claim 12, wherein the wireless communication network is within the building.

22. A method for communicating between a mobile transceiver in a building having one or more floors and a wireless communication network, the method comprising:

dividing a plurality of slave transceivers into a main sub-group of slave transceivers and a diversity sub-group of slave transceivers, the transceivers being operative to transmit signals of a type which are conveyed over the wireless communication network;

positioning on at least one of the floors of the building at leas t one slave transceiver of a first one of the sub-groups and a plurality of slave transceivers of a second one of the sub-groups, so that a nearest neighbor of each slave transceiver on the at least one of the floors belongs to the other sub-group; and conveying a signal between the wireless communication network and the mobile transceiver via one or more of the plurality of slave transceivers positioned in the building.

23. The method according to claim 22, wherein positioning on the at least one of the floors comprises measuring the nearest neighbor of each slave transceiver on the at least one of the floors in a generally horizontal direction.

24. The method according to claim 22, wherein positioning on the at least one of the floors comprises measuring the nearest neighbor of each slave transceiver on the at least one of the floors in a generally non-horizontal direction.

25. Apparatus for communicating between a mobile transceiver in a building having one or more floors and a wireless communication network, comprising:

a plurality of slave transceivers, operative to transmit signals between the wireless communication network and the mobile transceiver, the slave transceivers comprising:

a main sub-group of slave transceivers; and a diversity sub-group of slave transceivers, at least one of a first one of the sub-groups and a plurality of a second one of the sub-groups being positioned on at least one floor, so that a nearest neighbor of each slave transceiver on the at least one of the floors belongs to the other sub-group.

26. The apparatus according to claim 25, wherein the nearest neighbor of each slave transceiver is measured in a generally horizontal direction.

27. The apparatus according to claim 25, wherein the nearest neighbor of each slave transceiver is measured in a generally non-horizontal direction.

* * * * *